(12) United States Patent
Cooper

(10) Patent No.: US 12,347,254 B2
(45) Date of Patent: Jul. 1, 2025

(54) USING COMBINATION OF GPS AND BLE BEACONING TO LOCATE A LOCK BOX

(71) Applicant: CARRIER CORPORATION, Palm Beach Gardens, FL (US)

(72) Inventor: Adam Cooper, Independence, OR (US)

(73) Assignee: HONEYWELL INTERNATIONAL, INC., Charlotte, NC (US)

( * ) Notice: Subject to any disclaimer, the term of this patent is extended or adjusted under 35 U.S.C. 154(b) by 0 days.

(21) Appl. No.: 17/767,286

(22) PCT Filed: Oct. 7, 2020

(86) PCT No.: PCT/US2020/054465
§ 371 (c)(1),
(2) Date: Apr. 7, 2022

(87) PCT Pub. No.: WO2021/071866
PCT Pub. Date: Apr. 15, 2021

(65) Prior Publication Data
US 2022/0366745 A1    Nov. 17, 2022

Related U.S. Application Data

(60) Provisional application No. 62/911,531, filed on Oct. 7, 2019.

(51) Int. Cl.
*G07C 9/00* (2020.01)
*E05B 47/00* (2006.01)
(Continued)

(52) U.S. Cl.
CPC .......... *G07C 9/00571* (2013.01); *E05B 47/00* (2013.01); *H04B 17/327* (2015.01);
(Continued)

(58) Field of Classification Search
CPC ...... G07C 9/00571; G07C 2009/00769; G07C 2209/63; H04B 17/327; H04W 48/08;
(Continued)

(56) References Cited

U.S. PATENT DOCUMENTS 6,700,533 B1 * 3/2004 Werb ................. G01S 5/0018
701/470
8,040,218 B2   10/2011 Hays et al.
(Continued)

FOREIGN PATENT DOCUMENTS

WO    2015160180 A1    10/2015
WO    2017180454 A1    10/2017

OTHER PUBLICATIONS

Notification of Transmittal of the International Search Report for Application No. PCT/US2020/054465; Report Issued: Dec. 11, 2020; 6 pages.
(Continued)

*Primary Examiner* — Naomi J Small
(74) *Attorney, Agent, or Firm* — CANTOR COLBURN LLP

(57) ABSTRACT

A method of locating a lock box including: obtaining a saved location of the lock box using an application operated via a first cellular telephone, the saved location of the lock box being accurate within a first selected radius; displaying the saved location of the lock box on the first cellular telephone via the application; detecting a Bluetooth advertisement of the lock box using the first cellular telephone; determining a received signal strength indicator (RSSI) of the Bluetooth advertisement; determining a distance between the first cellular telephone and the lock box in response to the RSSI of the Bluetooth advertisement; and displaying a distance
(Continued)

indicator depicting the distance between the first cellular telephone and the lock box on the first cellular telephone via the application.

11 Claims, 3 Drawing Sheets

(51) Int. Cl.
    *H04B 17/327*     (2015.01)
    *H04W 48/08*     (2009.01)
    *H04W 4/80*     (2018.01)

(52) U.S. Cl.
    CPC ..... *H04W 48/08* (2013.01); *E05B 2047/0096* (2013.01); *G07C 2009/00769* (2013.01); *G07C 2209/63* (2013.01); *H04W 4/80* (2018.02)

(58) Field of Classification Search
    CPC ... H04W 4/80; E05B 47/00; E05B 2047/0096
    USPC ........................................................ 340/5.61
    See application file for complete search history.

(56) References Cited

U.S. PATENT DOCUMENTS

| | | | |
|---|---|---|---|
| 8,188,837 B2 | 5/2012 | Patenaude et al. | |
| 8,253,559 B2 | 8/2012 | Howard et al. | |
| 9,455,839 B2 | 9/2016 | Conrad et al. | |
| 9,460,480 B2 | 10/2016 | Woodard et al. | |
| 9,659,424 B2 | 5/2017 | Huber et al. | |
| 9,704,319 B2 | 7/2017 | Desinor, Jr. | |
| 9,734,646 B1 | 8/2017 | Noell | |
| 9,916,742 B2 | 3/2018 | Kuenzi | |
| 10,094,885 B2 | 10/2018 | Kalous et al. | |
| 10,127,746 B2 | 11/2018 | Bergdale et al. | |
| 10,237,690 B2* | 3/2019 | Thakur | H04W 4/023 |
| 10,299,078 B2* | 5/2019 | Zhou | G01S 11/06 |
| 2014/0266588 A1 | 9/2014 | Majzoobi | |
| 2016/0127875 A1* | 5/2016 | Zampini | G01S 5/0226 |
| | | | 370/311 |
| 2017/0103597 A1 | 4/2017 | Fisher | |
| 2017/0270726 A1 | 9/2017 | Fisher et al. | |
| 2018/0190056 A1* | 7/2018 | Desinor, Jr. | G07C 9/00309 |
| 2018/0301037 A1* | 10/2018 | Wang | G08G 1/205 |
| 2019/0005564 A1 | 1/2019 | Beatty et al. | |
| 2019/0080371 A1 | 3/2019 | Spath | |

OTHER PUBLICATIONS

Written Opinion of the International Searching Authorithy for Application No. PCT/US2020/054465; Report Issued: Dec. 11, 2020; 8 pages.

* cited by examiner

USING COMBINATION OF GPS AND BLE BEACONING TO LOCATE A LOCK BOX

CROSS-REFERENCE TO RELATED APPLICATIONS

This application is a National Stage Application of International Application No. PCT/US2020/054465 filed Oct. 7, 2020, which claims the benefit of 62/911,531 filed Oct. 7, 2019, the disclosures of which are incorporated herein by reference in their entirety.

BACKGROUND

The subject matter disclosed herein generally relates to the field of lock boxes, and more particularly to an apparatus and method for locating lock boxes.

Lock boxes are typically used to a provide a secured storage area for a key or other access aid at a location close to a locked property accessible by the key. In this way, an authorized user can unlock the secured storage area, obtain the key and then use the key to unlock the locked property.

The locked property may be a home or other property that is locked while unattended by a traditional lock that requires a key. In other situations, the locked property may be a commercial or industrial site, or other type of property.

The lock box is typically attached to a door handle or to another stationary object near the traditional lock. The lock box is typically configured to require the user to demonstrate that he is authorized to obtain access to the locked property before the secured storage area is unlocked to allow the user to obtain the key. In a mechanical lock box, the user might be required to enter a correct lock combination to access the secured storage area. In an electronic lock box, the user might be required to communicate a credential to the lock box (via a physical connection to the lock box or via a wireless link to the lock box) to access the secured storage area.

Conventional electronic lock boxes allow users to communicate their credentials wirelessly via the IrDA standard, i.e., by using infrared signals generated by the user's cellular telephone or personal digital assistant and directed toward the lock box. In addition, information is typically communicated in the other direction, i.e., from the lock box to the access device. Also, the lock box and/or the access device may have other communications links, such as with a central authorization authority that issues credentials to users and collects information from lock boxes on access activity. Infrared communications require line of sight alignment, which is often inconvenient.

BRIEF SUMMARY

According to one embodiment, a method of locating a lock box is provided. The method including: obtaining a saved location of the lock box using an application operated via a first cellular telephone, the saved location of the lock box being accurate within a first selected radius; displaying the saved location of the lock box on the first cellular telephone via the application; detecting a Bluetooth advertisement of the lock box using the first cellular telephone; determining a received signal strength indicator (RSSI) of the Bluetooth advertisement; determining a distance between the first cellular telephone and the lock box in response to the RSSI of the Bluetooth advertisement; and displaying a distance indicator depicting the distance between the first cellular telephone and the lock box on the first cellular telephone via the application.

In addition to one or more of the features described above, or as an alternative, further embodiments may include that prior to obtaining the saved location, the method further includes: receiving a user input on a second cellular telephone through an application operated via the second cellular telephone, the user input indicating that the lock box was installed; detecting a location of the second cellular telephone when the lock box was installed; equating the saved location of the lock box to the location of the second cellular telephone when the lock box was installed; and saving the saved location of the lock box.

In addition to one or more of the features described above, or as an alternative, further embodiments may include that prior to obtaining the saved location, the method further includes: automatically detecting that lock box was installed through an application, the application being operated via a second cellular telephone; detecting a location of the second cellular telephone when the lock box was installed; equating the saved location of the lock box to the location of the second cellular telephone when the lock box was installed; and saving the saved location of the lock box.

In addition to one or more of the features described above, or as an alternative, further embodiments may include that automatically detecting that lock box was installed through the application further includes: detecting locking of a shackle of the lock box.

In addition to one or more of the features described above, or as an alternative, further embodiments may include that the location of the second cellular telephone when the lock box was installed is detected using a global position system in electronic wireless communication with the second cellular telephone.

In addition to one or more of the features described above, or as an alternative, further embodiments may include that the location of the second cellular telephone when the lock box was installed is detected using a global position system in electronic wireless communication with the second cellular telephone.

In addition to one or more of the features described above, or as an alternative, further embodiments may include that the second cellular telephone is the first cellular telephone.

In addition to one or more of the features described above, or as an alternative, further embodiments may include that the second cellular telephone is the first cellular telephone.

In addition to one or more of the features described above, or as an alternative, further embodiments may include that the second cellular telephone is not the first cellular telephone.

In addition to one or more of the features described above, or as an alternative, further embodiments may include that the second cellular telephone is not the first cellular telephone.

According to another embodiment, a computer program product embodied on a non-transitory computer readable medium is provided. The computer program product including instructions that, when executed by a processor, cause the processor to perform operations including: obtaining a saved location of the lock box using an application operated via a first cellular telephone, the saved location of the lock box being accurate within a first selected radius; displaying the saved location of the lock box on the first cellular telephone via the application; detecting a Bluetooth advertisement of the lock box using the first cellular telephone; determining a received signal strength indicator (RSSI) of the Bluetooth advertisement; determining a distance between the first cellular telephone and the lock box in response to the RSSI of the Bluetooth advertisement; and displaying a distance indicator depicting the distance between the first cellular telephone and the lock box on the first cellular telephone via the application.

In addition to one or more of the features described above, or as an alternative, further embodiments may include that prior to obtaining the saved location, the operations further include: receiving a user input on a second cellular telephone through an application operated via the second cellular telephone, the user input indicating that the lock box was installed; detecting a location of the second cellular telephone when the lock box was installed; equating the saved location of the lock box to the location of the second cellular telephone when the lock box was installed; and saving the saved location of the lock box.

In addition to one or more of the features described above, or as an alternative, further embodiments may include that prior to obtaining the saved location, the operations further include: automatically detecting that lock box was installed through an application, the application being operated via a second cellular telephone; detecting a location of the second cellular telephone when the lock box was installed; equating the saved location of the lock box to the location of the second cellular telephone when the lock box was installed; and saving the saved location of the lock box.

In addition to one or more of the features described above, or as an alternative, further embodiments may include that automatically detecting that lock box was installed through the application further includes: detecting locking of a shackle of the lock box.

In addition to one or more of the features described above, or as an alternative, further embodiments may include that the location of the second cellular telephone when the lock box was installed is detected using a global position system in electronic wireless communication with the second cellular telephone.

In addition to one or more of the features described above, or as an alternative, further embodiments may include that the location of the second cellular telephone when the lock box was installed is detected using a global position system in electronic wireless communication with the second cellular telephone.

In addition to one or more of the features described above, or as an alternative, further embodiments may include that the second cellular telephone is the first cellular telephone.

In addition to one or more of the features described above, or as an alternative, further embodiments may include that the second cellular telephone is the first cellular telephone.

In addition to one or more of the features described above, or as an alternative, further embodiments may include that the second cellular telephone is not the first cellular telephone.

In addition to one or more of the features described above, or as an alternative, further embodiments may include that the second cellular telephone is not the first cellular telephone.

Technical effects of embodiments of the present disclosure include saving a GPS location of a lock box during installation and then finding the lock box using a combination of the GPS location and a Bluetooth advertisement transmitted from the lock box.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

Figure 1:
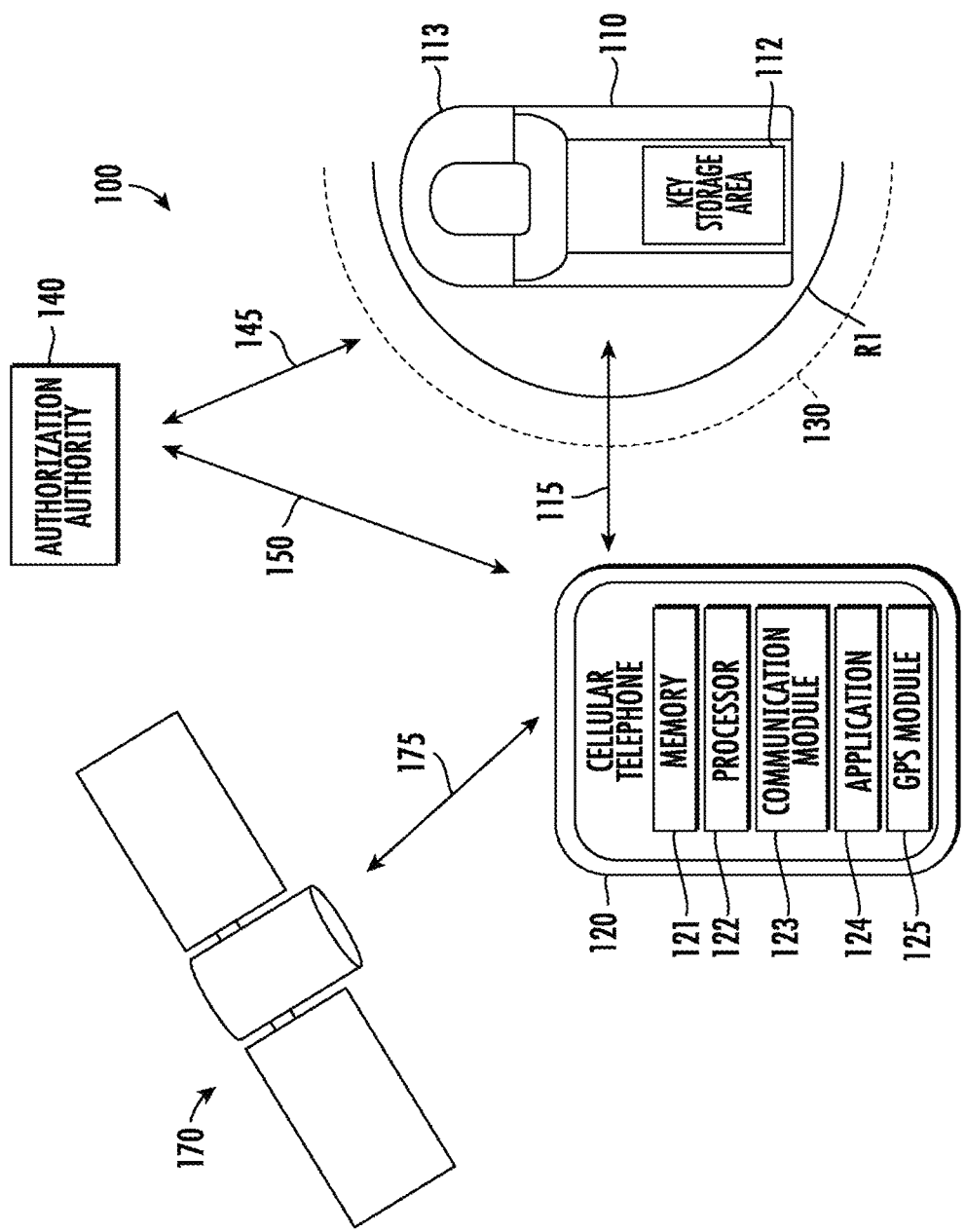
FIG. 1 illustrates a schematic view of a lock box, access device, and a remote authorization entity that is linked the access device, in accordance with an embodiment of the disclosure.

A detailed description of one or more embodiments of the disclosed apparatus and method are presented herein by way of exemplification and not limitation with reference to the Figures.

Described below is an apparatus and a method for locating a lock box after it has been locked in place or installed. In specific implementations, the lock box has a key storage area, which is typically positioned within or attached to a housing of the lock box and is sized to store a key or other access aid (e.g., a card). The key storage area has a cover (e.g., door) that is locked or secured with a lock mechanism. According to some implementations, the lock box has a circuit responsive to wireless communications from an access device within the working restricted range of the lock box. The circuit is configured to provide access to the stored key, such as by unlocking the lock mechanism or other action, when an authorized request for access is received from the access device.

The lock box includes a transceiver (if implemented for two-way communication) or a receiver (if implemented for one-way communication), and an appropriate antenna. The lock box circuit also includes logic or a controller that controls and coordinates the operation of the lock box and a lock mechanism activation portion operable to enable operation of the lock mechanism. One function of the logic or controller is to process information from the access device representing an identity of a user seeking access (such as a credential), determine whether access is authorized, and, depending upon that determination, either grant access (i.e., by unlocking the lock mechanism) or deny access (i.e., by maintaining the lock mechanism in a locked state). In some embodiments, the lock box circuit includes a real time clock and a battery for the real time clock. In some embodiments, the lock box circuit includes a processors, a memory and/or a display or other type of indicator.

The access device, also called a "key" or "electronic key," may be a cellular telephone, "smart" phone or other type of telephone (hereinafter "phone"), personal digital assistant (PDA) or other personal electronic device with restricted range communication capability. A dedicated access device, i.e., a device having a primary function of communicating with lock boxes, may also be used. Although this application is primarily concerned with Bluetooth wireless communications between the access device and the lock box not limited to Bluetooth communication, the lock box may also support other forms of communication, such as Wi-Fi, ZigBee, IrDA, etc., to allow other forms of access devices to be used in the system.

Embodiments disclosed herein relate utilizing a two-step process to locate a lock box. The two step process involves (1) using a cellular telephone to locate the general location of the lock box through a global positioning system (GPS) and then (2) utilizing a received signal strength indicator of a Bluetooth communication between the lock box and the cellular telephone to narrow down the location of the lock box.

Referring to FIG. 1, a schematic view of a lock box 110 and access key system 100. A lock box 110 with wireless communications capability is shown in relation to an access device, which in this example is a cellular telephone 120. The restricted range of the lock box is shown schematically at 130. Thus, the cellular telephone 120 as shown in FIG. 1 is outside of the lock box's operating range 130, and would need to be moved within the range 130 to communicate with the lock box 110.

Communications between the lock box 110 and the cellular telephone 120 may be two-way, as indicated by the two-way arrow representing a communications link 115. In some cases, one-way communication from the cellular telephone 120 to the lock box 110 may be sufficient.

All of the conventional functions of the lock box 110 are supported. Thus, the communications from the cellular telephone 120 to the lock box 110 would include the ability for the user of the cellular telephone 120 to make an access request directed to the lock box 110. This access request would include communication of a credential indicating that the user is authorized for access.

In response, the lock box 110 may communicate a message, either via a display on the lock box 110 or via a message transmitted to the cellular telephone 120, denying access. Access may be denied, e.g., if the user is unauthorized, if the user's credentials have expired, or if the access privileges have been superseded (i.e., if the property owner has overridden access privileges or is invoking the call before showing feature).

If access is granted, the lock box 110 allows the user to gain access to a key storage area in the lock box 110 or open a shackle 113 for removing the lock box 110 from an object to which it is attached (e.g., a door). In specific implementations, the lock box 110 has a circuit that controls a lock mechanism that secures the key storage area 112 and shackle 113 in a locked condition when in use. When an access request is granted, the circuit unlocks the lock mechanism to provide the user access to the storage area 112, the shackle 113, or both.

The lock box 110 may use Bluetooth wireless communications, either instead of or in addition to the current IrDA communications capability. The lock box 110 may function with power received from a dedicated battery in the lock box 110. The cellular telephone 120 may be any cellular telephone having a Bluetooth wireless communications capability.

Optionally, the system 100 may also include an authorization authority 140, which can be linked to the lock box 110 (via a link 145), or to the cellular telephone 120 (via the link 150) or to both the lock box 110 and the cellular telephone 120. The authorization authority 140 can administer granting credentials to users, collect information on usage and activity and provide for updates to devices (lock boxes and access devices) in the system 100. Link 145 may be a one-time activity or connection that occurs during manufacturing of the lock box 110 when the lock box 110 is provisioned for the system 100 and programed to received credentials from a cellular telephone 120.

The cellular telephone 120 may include a processor 122, memory 121, a communication module 123, and an application 124, as shown in FIG. 1. The processor 122 can be any type or combination of computer processors, such as a microprocessor, microcontroller, digital signal processor, application specific integrated circuit, programmable logic device, and/or field programmable gate array. The memory 121 is an example of a non-transitory computer readable storage medium tangibly embodied in the cellular telephone 120 including executable instructions stored therein, for instance, as firmware. The communication module 123 may implement one or more communication protocols, such as, for example, short-range wireless protocols and long-range wireless protocols. Short-range wireless protocols 203 may include but are not limited to Bluetooth, Wi-Fi, HaLow (801.11ah), zWave, ZigBee, or Wireless M-Bus. Long-range wireless protocols may include but are not limited to cellular, satellite, LTE (NB-IoT, CAT M1), LoRa, Satellite, Ingenu, or SigFox. The communication module 123 may be in communication with at least one of the lock box 110 and the authorization authority 140.

The application 124 is configured to generate a graphical user interface on the cellular telephone 120. A user of the cellular telephone 120 may interact with the application 124 through the graphical user interface. The application 124 may be computer software installed directly on the memory 121 of the cellular telephone 120 and/or installed remotely and accessible through the cellular telephone 120 (e.g., software as a service).

The cellular telephone 120 may also include a GPS module 125 configured to communicate with a GPS system 170. The cellular telephone 120 is in wireless electronic communication with the GPS system via link 175. The application 124 may utilized the GPS module 125 to detect a location of the cellular telephone 120. The location of the cellular telephone 120 detected by the GPS module 125 may be accurate within a first selected radius. Currently, GPS modules 125 within cellular telephones are typically accurate to between 26-49 feet (8-15 meters) and thus the first selected radius may be between 26-49 feet (8-15 meters). However, it is understood that as GPS technology progresses the accuracy of the GPS modules 125 will improve and thus the embodiments described herein are also applicable to GPS modules 125 with first selected radii less than or greater than between 26-49 feet (8-15 meters). The location of the cellular telephone 120 may also be determined using other location detection methods, including, but not limited to, cell triangulation, and/or detection of wireless signal strength (e.g., received signal strength (RSS) using Bluetooth, Wi-Fi, . . . etc.).

When an individual, such as, for example, a realtor installs the lock box 110 may through a user input on cellular telephone 120 may make note in the application 124 that the lock box 110 was installed. At the time the lock box 110 is installed, the application detects a location of the cellular telephone 120 through the GPS system 170 (or other means) and assigns the detected location to the lock box 110 in the application 124. The locations of the lock box 110 may be saved in the authorization authority 140, so that any individual (e.g., realtor) with authorization may be able to view the location of the lock box 110 using a cellular telephone 120.

An individual may view the location of the lock box 110 in the application 124, such as, for example on a map. When the individual desires to retrieve the lock box 110 they may view the location of the lock box 110 on a map through the application 124. The location of the lock box 110 may be accurate within a first selected radius R1, thus when the individual is looking for the lock box 110 proximate or within that first selected radius R1 of the lock box 110 may still be difficult to find, thus the application 124 may begin to search for a Bluetooth advertisement 126 (see FIG. 2) of the lock box 110 to further pinpoint the location of the lock box 110. The first selected radius R1 may be inside or outside the Bluetooth range 130 of the lock box 110. The first selected radius R1 is illustrated in FIG. 1 as being circumferentially around that the lock box 110 because the first selected radius R1 is established at the time that the lock box 110 is installed using the cellular telephone 120 and at this time of installation the cellular telephone 120 will be next to (i.e., proximate) the lock box 110.

Figure 2:
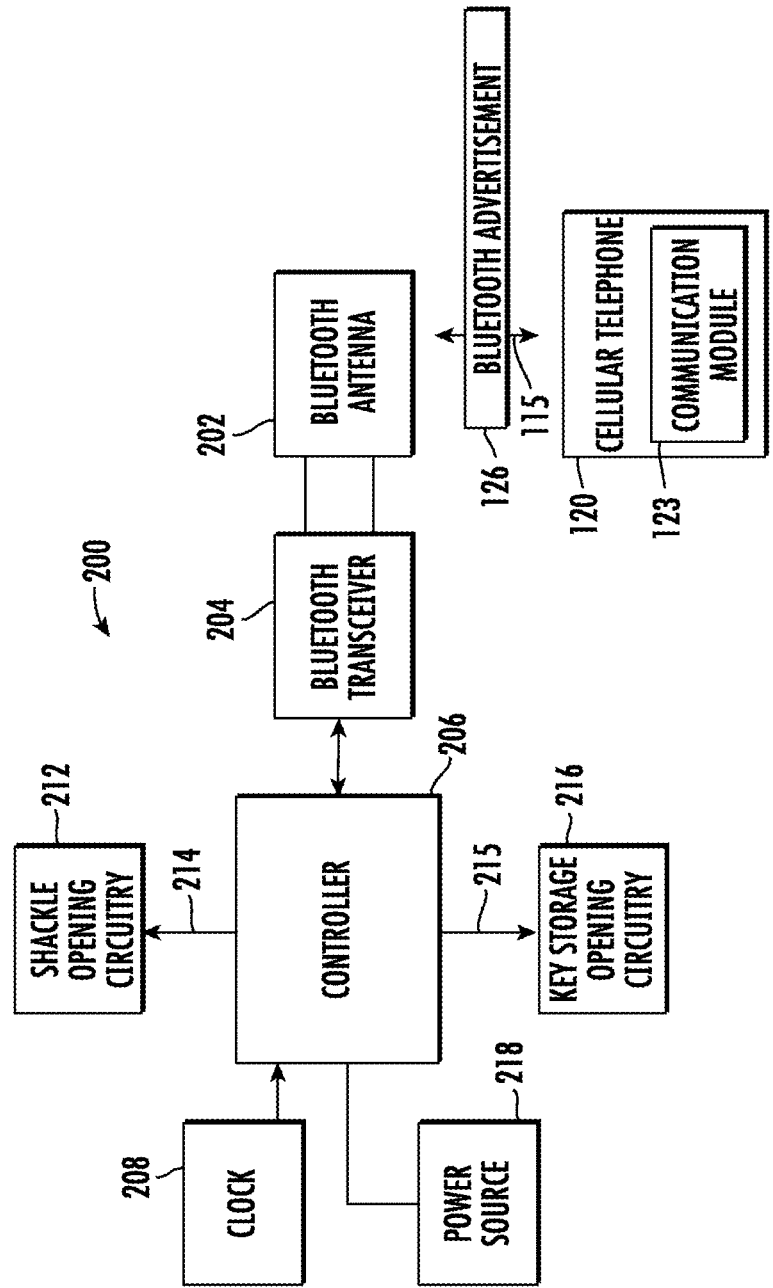
FIG. 2 illustrates a schematic view of a hardware circuit associated with the lock box and access device of FIG. 1, according to an embodiment of the present disclosure.

FIG. 2 is an embodiment of a hardware circuit that can be used in association with system 100 of FIG. 1. A circuit 200 includes an antenna 202 and an Bluetooth transceiver 204. The Bluetooth transceiver 204 can be coupled to a controller 206, such as a microprocessor or microcontroller. A clock 208 can be coupled to the controller 206 in a well-known fashion. The controller 206 is coupled to the Bluetooth transceiver 204 for two-way communication there between. The controller 206 can also be coupled to one or more lock opening circuits associated with the lock box that open associated locking mechanisms. For example, a shackle opening circuit 212 opens a locking mechanism of shackle 113 in response to an activation signal 214 from the controller 206. Likewise, the controller 206 can be coupled to a key storage opening circuit 216 to open a locking mechanism associated with the key storage area 112 in response to activation of a signal 215. The circuits used at 212 and 216 are well-known in the art and generally include charge pumps and capacitors to raise the voltage levels needed to operate the locking mechanisms. A power source 218, such as a battery, can be coupled to all of the components in the circuit 200 needing power, such as the clock 208, the controller 206, and the circuits 212 and 216. The power source 218 may optionally also be coupled to the Bluetooth transceiver 204.

The Bluetooth transceiver 204 through the antenna 220 periodically transmits a Bluetooth advertisement 126. The communication module 123 of the cellular telephone is configured to detect the Bluetooth advertisement 126. Once the Bluetooth advertisement 126 is detected, the cellular telephone 120 may determine a received signal strength indicator (RSSI) of the Bluetooth advertisement 126 and then determine an approximate distance between the cellular telephone 120 and the lock box 110 in response to the RSSI of the Bluetooth advertisement 126.

Figure 3:
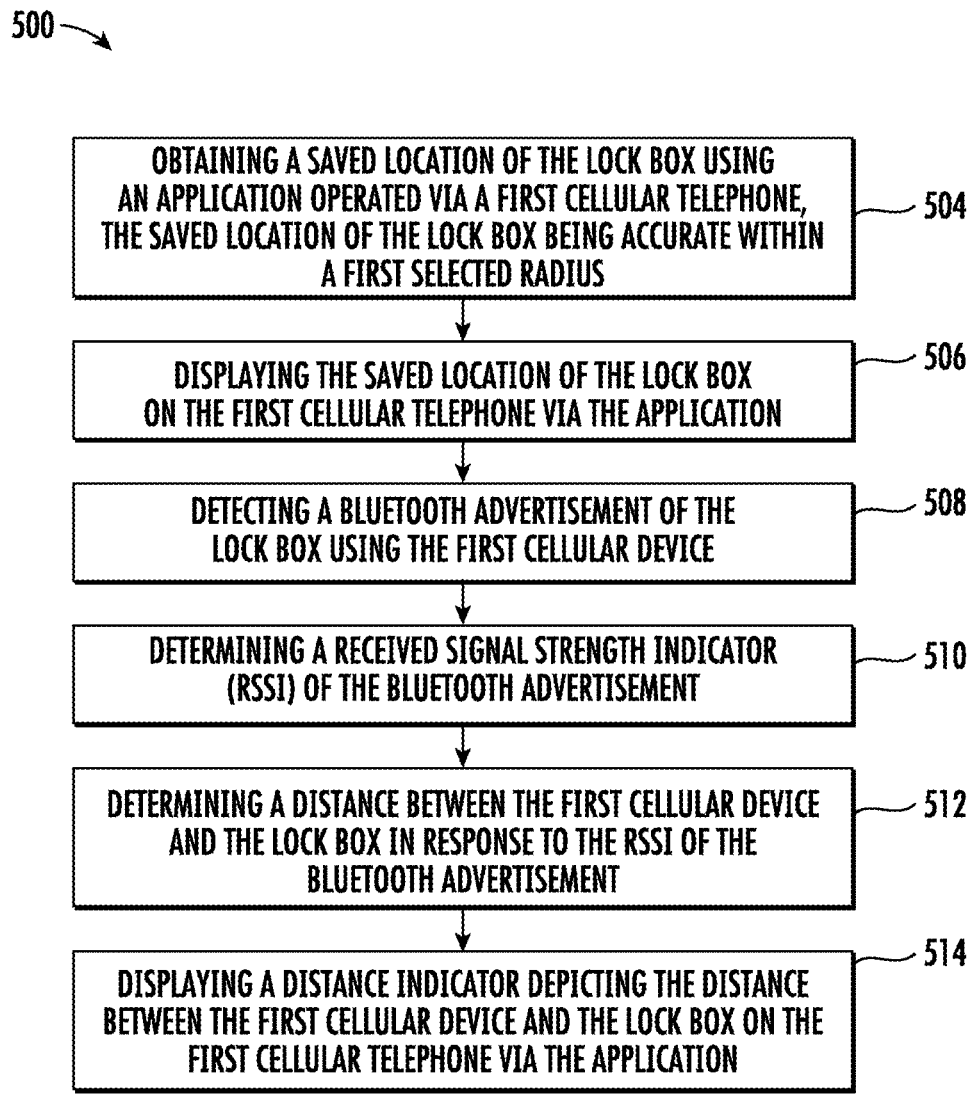
FIG. 3 is a flow diagram illustrating a method locating the lock box of FIGS. 1 and 2, according to an embodiment of the present disclosure.

Referring now to FIG. 3 with continued reference to FIGS. 1 and 2. FIG. 3 shows a flow chart of a method 500 of locating a lock box 110, in accordance with an embodiment of the disclosure.

At block 504, a saved location of the lock box 110 is obtained using an application 124 operated via a first cellular telephone 120, the saved location of the lock box 110 being accurate within a first selected radius R1.

At block 506, the saved location of the lock box 110 is displayed on the first cellular telephone 120 via the application 124. The saved location of the lock box 110 is displayed on the first cellular telephone 120 via the application 124 so that an individual (e.g., realtor) trying to find the lock box 110 may be able to narrow down the location of the lock box 110 to within the first selected radius R1.

At block 508, a Bluetooth advertisement 126 of the lock box 110 using the first cellular telephone 120. At block 510, a received signal strength indicator (RSSI) of the Bluetooth advertisement 126 is determined. At block 512, a distance between the first cellular telephone 120 and the lock box 110 is determined in response to the RSSI of the Bluetooth advertisement 126. At block 514, a distance indicator depicting the distance between the first cellular telephone 120 and the lock box 110 on the first cellular telephone 120 is displayed via the application 124. The distance indicator may be a numerical number indicating an approximate distance between the first cellular telephone 120 and the lock box 110 or a general distance indication term depicting the distance, including, but not limited to, "near" indicating that the first cellular telephone 120 is near the lock box 110 or "far" indicating that the first cellular telephone 120 is far from the lock box 110.

Prior to obtaining the saved location, the method 500 may further comprise that a user input on a second cellular telephone 120 is received through an application 124 operated via the second cellular telephone 120. The user input may be a touch, tap, click, button push on the second cellular telephone 120. The user input may also be a voice command. The user input indicates that the lock box 110 was installed of the user input may be a command to install the lock box 110 by locking the shackle 113. A location of the second cellular telephone 120 is detected when the lock box 110 was installed. The saved location of the lock box 110 is equated to the location of the second cellular telephone 120 when the lock box 110 was installed and the saved location of the lock box 110 is saved.

Prior to obtaining the saved location, the method 500 may further comprise that it is automatically detected that lock box 110 was installed through an application 124. The application 124 being operated via a second cellular telephone 120. A location of the second cellular telephone 120 is detected when the lock box 110 was installed. The saved location of the lock box 110 is equated to the location of the second cellular telephone 120 when the lock box 110 was installed and the saved location of the lock box 110 is saved.

The lock box 110 may be automatically detected by detecting locking of a shackle 113 of the lock box 110. The location of the second cellular telephone 120 may be detected when the lock box 110 was installed using a global position system in electronic wireless communication with the second cellular telephone 120. In an embodiment, the second cellular telephone 120 is the first cellular telephone 120, meaning that the same realtor installs the lock box 110 and is trying to find the lock box. Whereas, in another embodiment, the second cellular telephone 120 is not the first cellular telephone 120, meaning that a seller's realtor may install the lock box 110 and a buyer's realtor may be looking for the lock box 110 in one example.

While the above description has described the flow process of FIG. 3 in a particular order, it should be appreciated that unless otherwise specifically required in the attached claims that the ordering of the steps may be varied.

As described above, embodiments can be in the form of processor-implemented processes and devices for practicing those processes, such as processor. Embodiments can also be in the form of computer program code (e.g., computer program product) containing instructions embodied in tangible media, such as floppy diskettes, CD ROMs, hard drives, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an device for practicing the exemplary embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of locating a lock box, the method comprising:
    obtaining a saved location of the lock box using an application operated via a first cellular telephone, the saved location of the lock box being accurate within a first selected radius, the lock box including a shackle and a key storage area;
    displaying the saved location of the lock box on the first cellular telephone via the application;
    detecting a Bluetooth advertisement of the lock box using the first cellular telephone;
    determining a received signal strength indicator (RSSI) of the Bluetooth advertisement;
    determining a distance between the first cellular telephone and the lock box in response to the RSSI of the Bluetooth advertisement;
    displaying a distance indicator depicting the distance between the first cellular telephone and the lock box on the first cellular telephone via the application;
    receiving at the lock box an access request from the first cellular telephone;
    unlocking the shackle in response to the access request from the first cellular telephone;
    unlocking the key storage area in response to the access request from the first cellular telephone;
    wherein prior to obtaining the saved location, the method further comprises:
    receiving a user input on a second cellular telephone through an application operated via the second cellular telephone, the user input indicating that the lock box was installed;
    detecting a location of the second cellular telephone when the lock box was installed;
    equating the saved location of the lock box to the location of the second cellular telephone when the lock box was installed; and
    saving the saved location of the lock box.

2. The method of claim 1, wherein the location of the second cellular telephone when the lock box was installed is detected using a global position system in electronic wireless communication with the second cellular telephone.

3. The method of claim 1, wherein the saved location is determined through a global position system.

4. A method of locating a lock box, the method comprising:
    obtaining a saved location of the lock box using an application operated via a first cellular telephone, the saved location of the lock box being accurate within a first selected radius, the lock box including a shackle and a key storage area;
    displaying the saved location of the lock box on the first cellular telephone via the application;
    detecting a Bluetooth advertisement of the lock box using the first cellular telephone;
    determining a received signal strength indicator (RSSI) of the Bluetooth advertisement;
    determining a distance between the first cellular telephone and the lock box in response to the RSSI of the Bluetooth advertisement;
    displaying a distance indicator depicting the distance between the first cellular telephone and the lock box on the first cellular telephone via the application;
    receiving at the lock box an access request from the first cellular telephone;
    unlocking the shackle in response to the access request from the first cellular telephone;
    unlocking the key storage area in response to the access request from the first cellular telephone;
    wherein prior to obtaining the saved location, the method further comprises:
    automatically detecting that lock box was installed through an application, the application being operated via a second cellular telephone;
    detecting a location of the second cellular telephone when the lock box was installed;
    equating the saved location of the lock box to the location of the second cellular telephone when the lock box was installed; and
    saving the saved location of the lock box.

5. The method of claim 4, wherein automatically detecting that lock box was installed through the application further comprises:
    detecting locking of the shackle of the lock box.

6. The method of claim 4, wherein the location of the second cellular telephone when the lock box was installed is detected using a global position system in electronic wireless communication with the second cellular telephone.

7. A computer program product embodied on a non-transitory computer readable medium, the computer program product including instructions that, when executed by a processor, cause the processor to perform operations comprising:
- obtaining a saved location of the lock box using an application operated via a first cellular telephone, the saved location of the lock box being accurate within a first selected radius, the lock box including a shackle and a key storage area;
- displaying the saved location of the lock box on the first cellular telephone via the application;
- detecting a Bluetooth advertisement of the lock box using the first cellular telephone;
- determining a received signal strength indicator (RSSI) of the Bluetooth advertisement;
- determining a distance between the first cellular telephone and the lock box in response to the RSSI of the Bluetooth advertisement;
- displaying a distance indicator depicting the distance between the first cellular telephone and the lock box on the first cellular telephone via the application;
- receiving at the lock box an access request from the first cellular telephone;
- unlocking the shackle in response to the access request from the first cellular telephone;
- unlocking the key storage area in response to the access request from the first cellular telephone;
- wherein prior to obtaining the saved location, the operations further comprise;
- receiving a user input on a second cellular telephone through an application operated via the second cellular telephone, the user input indicating that the lock box was installed;
- detecting a location of the second cellular telephone when the lock box was installed;
- equating the saved location of the lock box to the location of the second cellular telephone when the lock box was installed; and
- saving the saved location of the lock box.

8. The computer program product of claim 7, wherein the location of the second cellular telephone when the lock box was installed is detected using a global position system in electronic wireless communication with the second cellular telephone.

9. A computer program product embodied on a non-transitory computer readable medium, the computer program product including instructions that, when executed by a processor, cause the processor to perform operations comprising:
- obtaining a saved location of the lock box using an application operated via a first cellular telephone, the saved location of the lock box being accurate within a first selected radius, the lock box including a shackle and a key storage area;
- displaying the saved location of the lock box on the first cellular telephone via the application;
- detecting a Bluetooth advertisement of the lock box using the first cellular telephone;
- determining a received signal strength indicator (RSSI) of the Bluetooth advertisement;
- determining a distance between the first cellular telephone and the lock box in response to the RSSI of the Bluetooth advertisement;
- displaying a distance indicator depicting the distance between the first cellular telephone and the lock box on the first cellular telephone via the application;
- receiving at the lock box an access request from the first cellular telephone;
- unlocking the shackle in response to the access request from the first cellular telephone;
- unlocking the key storage area in response to the access request from the first cellular telephone;
- wherein prior to obtaining the saved location, the operations further comprise:
- automatically detecting that lock box was installed through an application, the application being operated via a second cellular telephone;
- detecting a location of the second cellular telephone when the lock box was installed;
- equating the saved location of the lock box to the location of the second cellular telephone when the lock box was installed; and
- saving the saved location of the lock box.

10. The computer program product of claim 9, wherein automatically detecting that lock box was installed through the application further comprises:
- detecting locking of the shackle of the lock box.

11. The computer program product of claim 9, wherein the location of the second cellular telephone when the lock box was installed is detected using a global position system in electronic wireless communication with the second cellular telephone.

* * * * *